Feb. 18, 1969 R. A. LOCKWOOD 3,428,496

PORTABLE THERMOELECTRIC GENERATOR

Filed June 18, 1965 Sheet 1 of 4

INVENTOR
ROBERT ADDIS LOCKWOOD

BY Gerald A. Karis

ATTORNEY

INVENTOR.
ROBERT ADDIS LOCKWOOD
BY Gerald A. Koris
ATTORNEY

Feb. 18, 1969 R. A. LOCKWOOD 3,428,496

PORTABLE THERMOELECTRIC GENERATOR

Filed June 18, 1965 Sheet 3 of 4

INVENTOR.
ROBERT ADDIS LOCKWOOD

BY

ATTORNEY

INVENTOR
ROBERT ADDIS LOCKWOOD
BY Gerald A. Koris
ATTORNEY

United States Patent Office 3,428,496
Patented Feb. 18, 1969

3,428,496

PORTABLE THERMOELECTRIC GENERATOR

Robert Addis Lockwood, Northridge, Calif., assignor to North American Rockwell Corporation, a corporation of Delaware Filed June 18, 1965, Ser. No. 465,077
U.S. Cl. 136—208 7 Claims
Int. Cl. H01v 1/04

ABSTRACT OF THE DISCLOSURE

A thermoelectric generator is described which utilizes a hermetically sealed module of thermoelectric elements in the center of which is disposed a heat conducting sleeve for transmitting heat to the hot junctions of the thermoelectric elements. Fuel combustion apparatus is positioned adjacent the sleeve to uniformly distribute the heat over the surface of the sleeve. This fuel combustion apparatus also includes a means for vaporizing the fuel and mixing the vaporized fuel with air for combustion in the combustion apparatus.

The present invention is directed to a portable, fuel-fired, thermoelectric generating device, and more particularly to such a device having an improved combustion system.

The conventional portable power supplies, energized by batteries or gasoline engines, have a number of drawbacks, particularly where a lightweight, silent generator capable of using available hydrocarbon fuels is required. The gasoline engine electrical generator is relatively heavy, noisy, and requires vehicular transport for use in remote areas. Battery devices, while portable, have limited lifetimes and restricted operability under severe operating conditions such as sub-zero temperatures. In a wide range of communication, military surveillance and rescue operations, weight, lifetime and noise level impose strict requirements on portable power supplies.

Portable thermoelectric generators known to the prior art are deficient in one or more respects as will be apparent from comparing representative such prior art devices with the invention hereinafter described. For example, in U.S. Patent 3,056,848 (Meyers) combustion takes place in a region below the thermoelectric module, and heated air and combustion gases pass along the vertically disposed thermoelectric elements in heat-transfer relationship. Such a combustion and heat-transfer system is inherently not efficient and thereby the operating life of the unit is shortened. Since the quantity of fuel which can be carried in the storage tanks of a portable thermoelectric generator is limited, there is an incentive to obtain as efficient as possible utilization of fuel from a single filling of the tanks.

In U.S. Patent 2,480,404 (Findley et al.) a burner is provided for heating metallic thermocouple junctions, the flames being directed from a plurality of ports directly against the hot junctions, and the exhaust gases then discharged up past the thermocouples. In this system, heat removal is limited by the convective flow of the exhaust gases; the burner tubes are also colder than the thermoelectric junctions, thus drawing heat from the thermoelectric sections and lowering heat transfer efficiency. Other thermoelectric devices have related drawbacks in their fuel vaporization systems, combustion gas-air mixture means, heat removal systems, and in particular their means for distributing the combustion heat to the thermoelectric elements in an efficient manner.

The primary object of the present invention is to provide an improved portable thermoelectric generator.

Another principal object of the present invention is to provide in a portable thermoelectric generator improved fuel combustion and heat distribution means to the hot side of a thermoelectric junction, thereby lengthening the operating life of the device.

Another object is to provide a small, relatively lightweight, portable electrical generating power supply unit which can easily be carried by a single man.

Another object of the present invention is to provide a self-contained, portable electrical power supply using conventional hydrocarbon fuel, which converts the heat of combustion of the fuel to electricity by thermoelectric means and which is operable in a silent fashion for long periods of time.

Still another object is to provide such a portable thermoelectric generator which has no moving parts, and which provides a fuel vapor-air combustion mixture to a burner means and removes heat and combustion products from the generator by aspiration means.

A further object of the present invention is to provide an improved fuel boiler for a thermoelectric generator.

A still further object is to provide such a boiler which rapidly vaporizes and superheats a hydrocarbon fuel with minimum decomposition and removes fouling contaminants therefrom prior to injection into a combustion chamber.

Other objects and advantages of the present invention will become apparent to those skilled in the art from the following detailed description taken together with the appended claims and the accompanying drawings.

In the drawings, FIG. 1 is a perspective view, partly in section, of the present thermoelectric generator invention;

In the present thermoelectric generator, silent operation is atttained by using aspiration means both to supply a fuel-air combustion mixture and to move cooling air across the heat rejection surfaces. The fuel boiler is positioned to receive heat by conduction from the combustion region, and the fuel is efficiently heated, vaporized, and superheated therein by passage through a tortuous path. The vaporized fuel mixes with air in a fuel vapor-air aspirator, passes through the burner manifold into a plurality of burner tubes and exits through a plurality of ports therein, where burning occurs. The flame impinges upon a metal sleeve, which contacts the hot side of the thermoelectric couples. As a result of such direct impingement and spreading of the flame on the metal sleeve, uniform heat distribution and excellent heat transfer efficiency to the thermoelectric elements are obtained. The exhaust gases then pass back over the burner manifold to further preheat the fuel-air mixture and are vented to the environment through nozzles at the top of the combustion chamber, where, by aspiration, cooling air is drawn over heat rejection fins attached to the cold side of the thermoelectric module. In this manner, through the efficient delivery of heat to the hot wall of the thermoelectric module and the removal of heat from the cold side thereof, large quantities of heat are moved through the thermoelectric materials and the necessary $\Delta T$ maintained for efficient generation of electricity.

A more complete description of a preferred embodiment of the present invention will now be given with reference to the figures.

Figure 1:
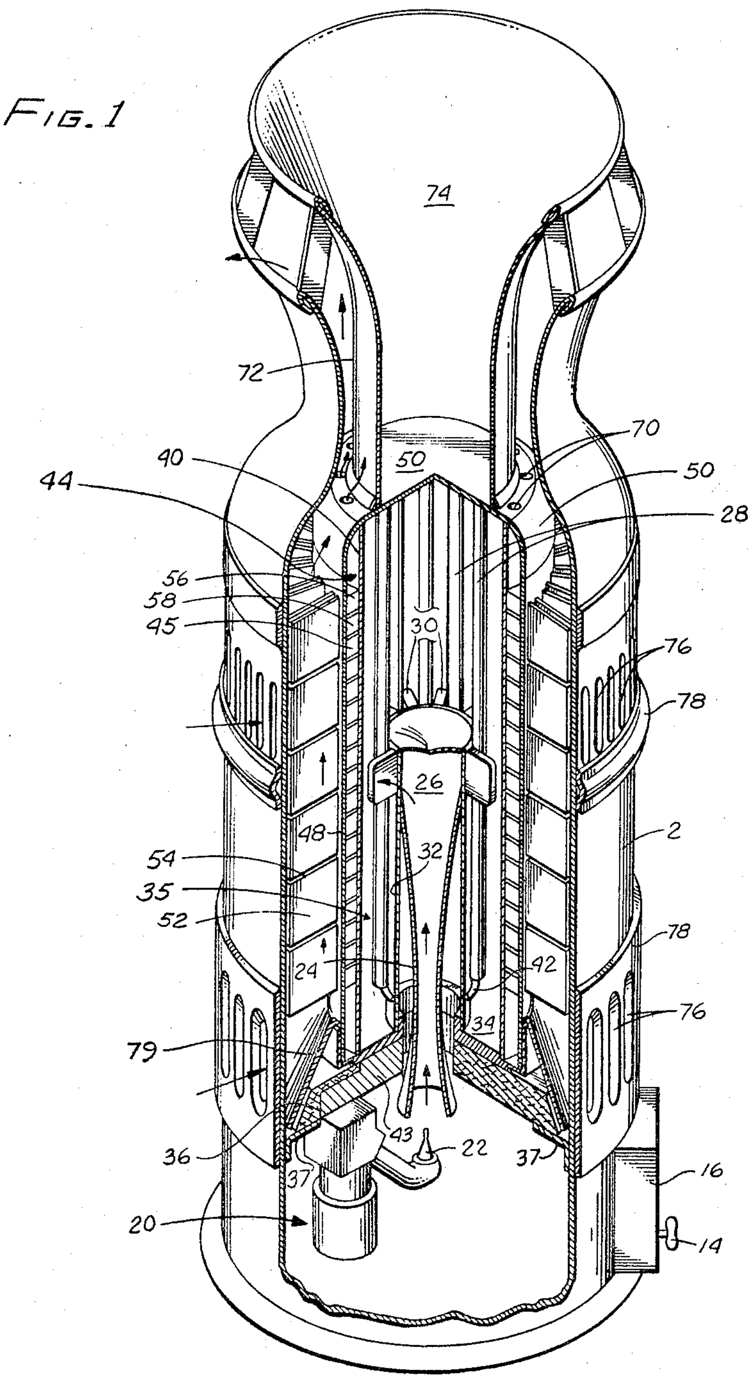
Figure 2:
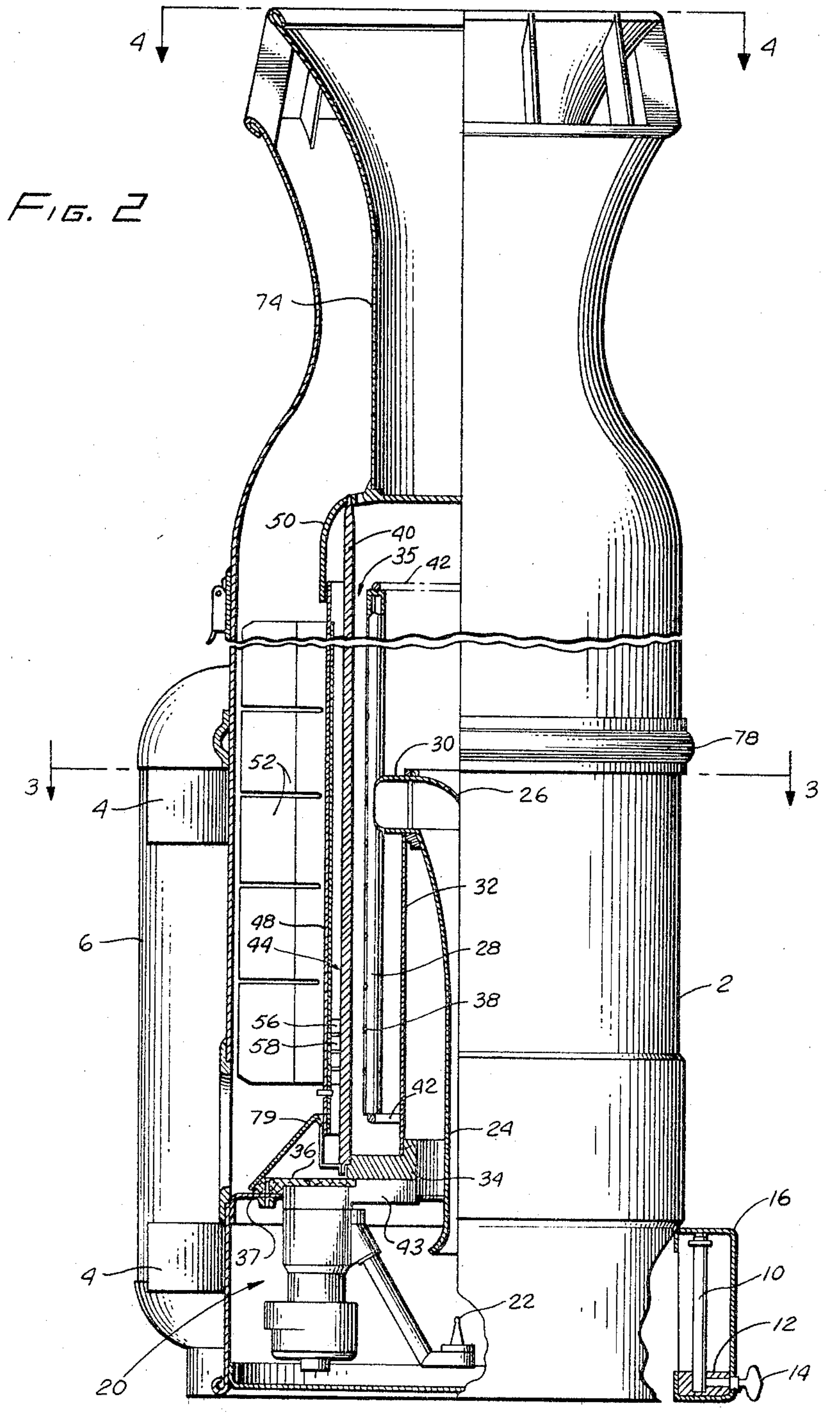
FIG. 2 is an elevation view of the generator, partly in section.
Figures 3, 4, 5, 6:
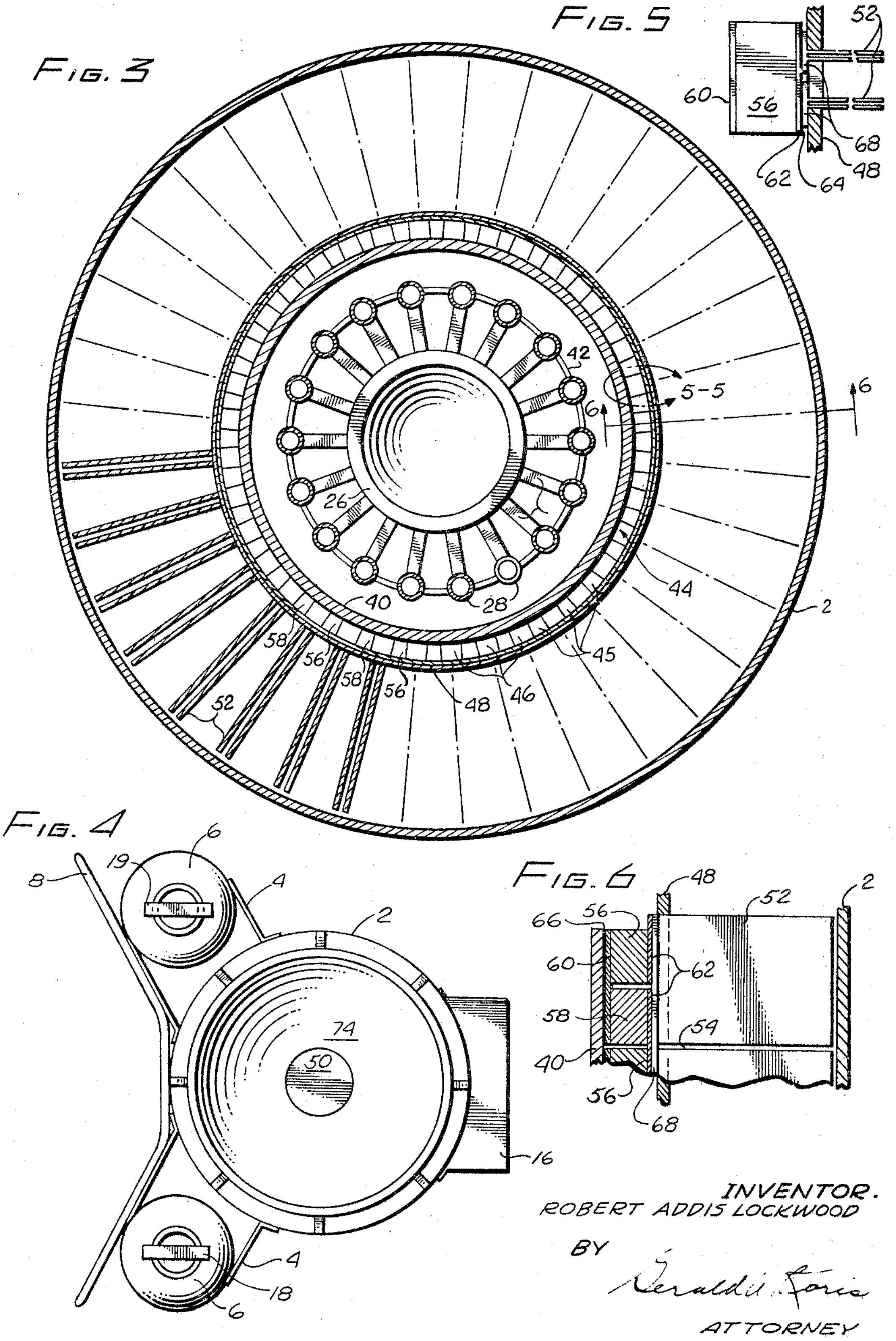
FIG. 3 is a section taken along lines 3—3 of FIG. 2, showing the fuel combustion and flame impingement means.
FIG. 4 is a plan view, taken along the lines 4—4 of FIG. 2.
FIG. 5 is an enlarged fragment taken from FIG. 3, indicated by the lines 5—5.
FIG. 6 is a section through a portion of FIG. 3, along the lines 6—6.

Referring now to FIGS. 1 and 2, the present thermoelectric generator comprises an outer, annular shell of aluminum 2. Attached to the shell by brackets 4 are two fuel tanks 6 and a harness 8 which permits the generator to be carried on the back of a man (FIG. 4). The generator is supported in a sitting position by a tripod comprising the two fuel tanks and a leg 10 supported by a block 12 whose position can be adjusted by means of a set screw 14. Also connected to the outside of the body shell is an instrument panel 16. The two fuel tanks 6 are pressurized by a hand-operated air pump 18 positioned on one of the tanks, and the tanks are maintained at equal pressure by a connecting tube (not shown). Tank pressure is indicated by gauge 19. The fuel is transferred through a filter and a pressure regulator (not shown) to a fuel boiler 20. The fuel is vaporized in boiler 20 and is emitted through a nozzle 22 into a converging-diverging combustion air aspirator section 24 where the fuel vapor mixes with air to form the combustion mixture. A burner manifold 26 is provided at the end of aspirator section 24 for distributing the fuel-air mixture to a plurality of axially extending burner tubes 28, each burner tube being supplied by an associated manifold tube 30. The manifold 26 and aspirator 24 are supported by an annular sleeve 32 which seats on the aluminum base plate 34 and seals the combustion zone 35 except from inlet gases entering through the aspirator-manifold system. Heat shunts from the burner to outer shell 2 are diminished by insulator means 36 such as of asbestos cement board, which is supported by bracket 37.

The burner tubes 27 are disposed in a spaced, annular array (FIG. 3), and each burner tube has a plurality of seventeen ports 38 along its length through which the heated combustion mixture is jetted at considerable velocity and burned. The burner tubes 28 are positioned within a concentric, annular sleeve or hot wall 40 of stainless steel against which the flames from burner ports 38 are directed against individual thermoelectric couple sites, one burner port being provided for each n-p couple. The burners 28 are supported by manifold 26, and spacing and additional support is provided by rings 42 at the top and at the bottom of the burners. The hot wall 40 extends below burner tubes 28 directly to base plate 34. The lower portion of hot wall 40, aluminum base plate 34, and an aluminum heat sink 43 between the base plate and boiler 20 provide a heat conduction path for heating the fuel in the boiler.

The hot wall 40 directly contacts the hot junctions of the individual thermoelectric elements of the theroelectrim module 44. The elements are disposed in an annular plurality of thirty-six tiers 45 (FIG. 3) which extend axially along the hot wall and are spaced by alternate rows of an electrical insulator 46 such as fibrous potassium titanate or aluminum silicate. An outer, concentric sleeve or cold wall 48 contacts the cold side of the thermoelectric elements and, in combination with hot wall 40, base plate 34, and top cap 50, hermetically seals the module. Cooling fins 32 of aluminum pass through this outer sleeve to directly contact the thermoelectric module. Each fin is composed of two metal plates which can be spread apart for improved cooling effect, and each fin has a plurality of horizontal slots 54 along its length for improved air circulation. Each axial tier or submodule of thermoelectric elements 45 is made up of a plurality of thirty-four spaced, alternate n-type 56 and p-type 58 thermoelectric segments or seventeen n-p couples, as seen in FIG. 1. The thermoelectric materials are of lead telluride; other thermoelectric materials known to the art such as bismuth telluride and germanium-silicon may also be used. Each thermoelectric segment is joined in electrical series to the preceding and succeeding segment in its tier by aluminum straps, as will be described in more detail below. The tiers 45 in turn are joined in electrical series by aluminum pins (not shown) which outwardly penetrate the cold wall, one pin contacting each outer segment at each end of each tier. The pins are joined, alternately at the top and bottom of each succeeding tier, by connecting rods (½ in. length of $\frac{1}{16}$ in. aluminum) welded thereto. Suitable electrical leads are provided for power take-off from the bottom of the module in place of one connection rod. A small bead of alumina or the like is slipped over each pin to insure electrical isolation from the cold wall. Since the electrical pins permit the leakage of some air, which would have a deleterious effect on the thermoelectric materials, the outer wall is sealed at the points of penetration by suitable sealing means, such as silicone rubber, elastomer sealants, epoxy resins, or the like.

The details of the assembly of the thermoelectric segments in submodule 45 will now be given with reference to FIGS. 5 and 6. Each thermoelectric segment has a hot shoe 60 and a cold shoe 62 of aluminum joined thereto by pressure bonding. The cold shoe is electrically, but not thermally, insulated from the base of each of the pair of fins 52 connected thereto by such means as a layer of an epoxy resin 64. The points of penetration of the fins through cold wall 48 are sealed, in the manner described above, to prevent in-leakage of air to the thermoelectric material. The thermoelectric segments are spaced from each other and supported by aluminum shoes 60 and 62. As seen in FIG. 6, a hot shoe 60 and a cold shoe 62 alternate in connecting a given segment with its preceding and succeeding neighbor, thereby providing the electrical series connection. The hot shoe is electrically, but not thermally, insulated from hot wall 40 by a sheet 66 of mica or the like. The bases 68 of fins 52 are joined to the fin bodies by brazing. The fins are divided into 6 2-in. sections, with 5 blind slots to divide them, but with a web at the outer edge to assure stiffness until after final assembly, when the outer web sections are removed.

Returning to FIGS. 1 and 2, the exhaust system will be described. The combustion zone 35 terminates in top cap 50 which has a plurality of spaced ports 70 through which the ehaust gases (combustion products and heater air) are vented to the environment through a cooling air aspirator or throats 72 defined by outer shell 2 and an inner inverted truncated conical member 74 joined thereto. Air is drawn over the fins through a plurality of slots 76 in two stiffening ring sections 78 on the outer shell, air drawn in through the lower set of slots being deflected upwardly by a tilted plate 79. The exhaust gases, vented at high velocity through exhaust ports 70, accelerate by aspiration movement of air over fins 52, thereby maintaining the cold side temperature of thermoelectric module 44.

Figure 7:
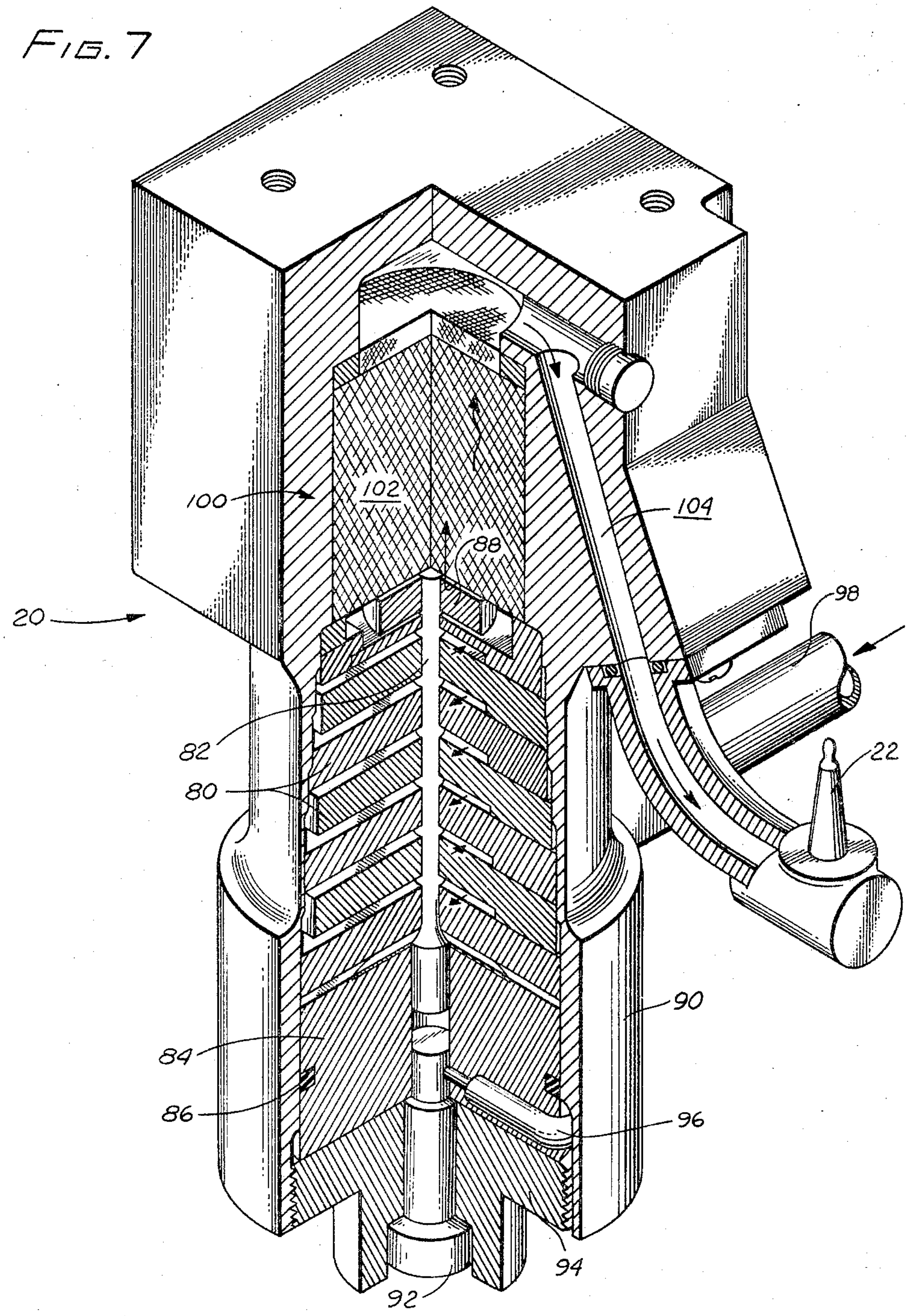
FIG. 7 is a perspective view, partly in section, of the fuel boiler.

The fuel boiler 20 is shown in more detail in FIG. 7. The heating surfaces comprise a plurality of axially spaced rings 80 positioned on a shaft 82 which terminates in a sealing plug 84 having an O-ring 86. The rings are locked into position on shaft 82 by means of a nut 88 prior to insertion into the boiler housing 90. This assembly is maintained in the housing by means of a nut 94 and withdrawing shoulder bolt 92 which inserts into plug 84. The plug (and the ring assembly) is constrained from rotation with bolt 92 by a pin 96.

Liquid fuel enters the boiler from the fuel supply tanks 6 through an inlet line 98 and is injected between the closely spaced slots of rings 80, which are arranged to provide the tortuous flow path shown by the arrows. Fuel is thereby constrained to pass over the heating surfaces in a thin film for maximum heating rate. The high heat transfer coefficient thus obtained causes rapid evaporation of the fuel so that decomposition on heating surfaces, normally to be expected, is suppressed by the short contact time. Heat is supplied to the fuel by conduction through the metal walls of boiler 20, the heat being directed to the top of the boiler by conduction from the combustion zone along the path previously described. The heat first raises the temperature of the fuel to its boiling point, then boils the fuel and next superheats the vapor to nearly the temperature of the boiler surfaces. Since the heat passes through the boiler downwardly from the top, the hotter region of the boiler coincides with the superheat region, and the cooler bottom region is for initial heating. This counter-current passing of heat and fuel further helps to prevent fuel decomposition.

The vaporized fuel on leaving the tortuous vaporization region then passes into a much larger volume chamber 100 for removal of contaminants, such as lead from gasoline, which might foul the nozzles or burner ports. The chamber 100 is filled with wire screen discs, sintered materials, or the like 102 for removal of contaminants. In this chamber, which is 10–100 times the volume of the heating surface region, the superheated vapor has a much longer residence time, which permits the vapor to react with such materials and to be stripped of fouling contaminants. The contents of chamber 100 may be easily removed for cleaning. Likewise, heating rings 80 mounted on shaft 82 may also be readily removed, disassembled, and cleaned. The vapor is thus more stable and less likely to foul surfaces, whose function would thereby be impaired. The vapor then passes out of the boiler through a connecting line 104 to fuel nozzle 22 from where it is mixed with air to provide the fuel-air combustion mixture.

The method of operation of this preferred embodiment of the present invention will now be given. The generator is 33 in. high and has an outer diameter of 10 in. The weight is about 50 lbs., including a 4-hour fuel load of gasoline, and has 150-watt output. The two fuel tanks 6 are pressurized by the hand-operated air pump on one of the tanks. The fuel stream is manually switched to a start-up nozzle (not shown) and later to run nozzle 22 when boiler 20 has reached the required temperature of 500° F., this temperature being necessary for proper working of the combustion air aspiration system. During normal operation, the gasoline is at a pressure of approximately 10 atmospheres, and is vaporized upon passing over heating rings 80 of the boiler at a high velocity. The fuel flow is maintained at about 1.4 lb. per hour by the run mode supersonic nozzle and the fuel pressure is regulated at 133 p.s.i. by the fuel pressure regulator. The run mode nozzle has a throat diameter of 0.0098 in., and the emitter vaporized fuel mixes with air in the combustion air aspirator 24, where it yields kinetic energy to accelerate air. The mixing aspirator and fuel nozzle sizes are such that the amount of air drawn in and mixed with the fuel is slightly (10–20%) in excess of the stoichiometric amount required to burn the fuel. The flow rate of the fuel and the air mixture through the aspirator throat is about 45 ft./sec.; after mixing with and accelerating the air, some of the kinetic energy of the fuel is then recovered as pressure. The temperature is maintained as low as is feasible (ambient +25° F.) in order to achieve maximum pressure in the diffuser. The combustion mixture of fuel and air then enters distribution manifold 26 to be evenly divided among the separate manifold tubes 30 for each burner tube 28. The hot manifold further preheats the combustion mixture using heat from the combustion products passing back over the manifold from hot wall 40.

The heated combustion mixture is then jetted at considerable velocity (5–30 ft./sec.) from the small flame ports 38 (0.078 in. diameter holes) in burner tubes 28. The combustion mixture jets from each port impinge on hot wall 40 adjacent its corresponding thermoelectric couple in a predetermined pattern that concentrates the heat released in areas directly contacting the thermoelectric elements. The calculated heat transfer efficiencies for the direct impinging flames are in the range of 60–70 percent.

The combustion products then leave the combustion area by passing back over and between burner tubes 28, where the combustion products are further cooled by preheating the incoming combustion mixture. This is of considerable importance in improving the heat transfer (and therefore fuel utilization) efficiencies of the system since it results in the burner tubes being at a higher temperature than that of the hot wall (heat sink). Thus, the temperature gradient is in the direction of the hot wall from the burner tubes, whereas if there were no reflection of the combustion gases over the burner tubes and they were directly exhausted to the environment, the burner tubes would be at a lower temperature than the thermoelectric junctions and the temperature gradient would be away from the thermoelectric elements towards the burner tubes, resulting in poorer heat transfer and fuel utilization. A further advantage of the multiple burner flames (and also exhaust nozzles) is the reduction in the audible output of the system. Silent operation of the burner-aspirator system is required for some applications and is desirable in many others.

The combustion products are then jetted from the combustion zone 35 through a set of eighteen small nozzles 70 in top cap 50 at a velocity of 84 ft./sec. Directing combustion gases through the nozzles at such velocity into the exhaust throat 72 provides aspiration for cooling air. The cooling air is drawn through the two sets of slots 76 in outer shell 2 over cooling fins 52, and then mixes with and undergoes an exchange of kinetic energy with the combustion gases in the exhaust throat 72. The cooling air is drawn across the fins at a flow velocity of about 4 ft./sec., and the exhaust gas mixture leaves the throat at a velocity of 12 ft./sec. These heating and cooling circuit conditions provide for the thermoelectric elements a hot junction temperature of about 900° F. and a cold junction temperature of about 500° F. The output of the thermoelectric generator is 150 watts and a voltage of 28 volts D.C. over an operating lifetime of a minimum of 1000 hours.

Although the preferred embodiment of the invention has been described in terms of a gasoline-fueled 150-watt thermoelectric generator, it is understood that other hydrocarbon fuels such as butane may be used, and that the size of the thermoelectric generator may be adjusted for larger or smaller electrical outputs. Further, the present invention is not limited to the foregoing specific details of the particular embodiment described, as many modifications will be apparent to those skilled in the art within its ambit. Therefore, the scope of the present invention is limited only by the appended claims.

What is claimed is:

1. A thermoelectric generator comprising
(a) a shell,
(b) a sleeve disposed coaxially therein defining a combustion zone,
(c) a hermetically sealed thermoelectric module containing a plurality of thermoelectric elements, the hot junctions of which are in thermal contact with the outer surface of said sleeve, said thermoelectric elements being arranged in a plurality of spaced tiers extending parallel to said sleeve, said thermoelectric elements being arranged in electrical series connection,
(d) a plurality of heat rejection fins within said shell thermally connected to the cold junctions of said thermoelectric elements,
(e) means for electrically insulating said thermoelectric elements from said sleeve and from said fins,
(f) a plurality of spaced burner tubes positioned within said sleeve and extending parallel thereto, each said burner tube having a plurality of ports facing said sleeve, said ports being adapted to uniformly impinge combustion flames emanating therefrom against the sleeve and distribute heat to said hot junctions of said thermoelectric elements, (g) a burner manifold connected to said burner tubes for uniformly distributing a combustion mixture of vaporized fuel and air to said burner tubes,
(h) a combustion air aspirator connected at one end to said manifold and at the other end adapted to receive a mixture of vaporized fuel and air,
(i) a fuel boiler having an outlet nozzle adapted to heat fuel received from a fuel supply and discharge fuel vapor through said nozzle at high velocity into said combustion air aspirator, and
(j) combustion product gas exhaust means including
(i) a plurality of exhaust ports positioned above said combustion zone and communicating therewith, and
(ii) a plurality of spaced slots in said shell adjacent said fins for admitting cooling air thereto, the exhaust combustion product gases departing from said combustion zone through said exhaust ports at high velocity serving to aspirate cooling air across said fins and then mixing therewith in exhausting from said thermoelectric generator.

2. A thermoelectric generator comprising
(a) an outer annular shell,
(b) a concentric annular sleeve disposed within said shell defining a combustion zone, said sleeve sealed at one end by a cap, said sleeve connected at its other end to a base plate joining to said outer shell,
(c) a combustion zone defined within said sleeve,
(d) an annular hermetically sealed thermoelectric module comprising a plurality of individual thermoelectric elements arranged in a plurality of spaced axial tiers, the elements and tiers being connected in electrical series, the hot junctions of said elements thermally connected to and electrically insulated from said sleeve,
(e) a plurality of heat rejection fins connected to the cold junctions of said thermoelectric elements,
(f) an annular, spaced plurality of burner tubes extending axially along and adjacent the inner surface of said sleeve, each of said burner tubes having a plurality of flame ports for directing combustion flames against said sleeve and uniformly distributing heat to the hot junctions of said thermoelectric elements,
(g) a burner manifold connecting to each of said burner tubes for uniformly distributing a combustion mixture of fuel vapor and air thereto,
(h) a combustion air aspirator connected at one end to said manifold for delivering said combustion mixture thereto, the other end of said aspirator being adapted to receive a mixture of fuel vapor and air, said combustion zone being sealed against inlet gases except through said aspirator,
(i) a fuel boiler having a discharge nozzle and connected to a fuel supply for heating fuel and discharging the resulting fuel vapor through said nozzle at high velocity into said combustion air aspirator, and
(j) combustion gas exhaust aspirator means comprising
(i) a member connected to said top cap of said combustion zone, said member and said outer shell defining an annular throat for passage of exhaust gases to the environment,
(ii) a plurality of spaced exhaust ports on said cap communicating with said exhaust throat, and
(iii) a plurality of spaced slots on said outer shell for admitting air to said cooling fins, said cooling fins in communication with said exhaust throat, the high velocity discharge of combustion gases through said exhaust ports after reflection from said inner shell over said burner tubes serving to aspirate cooling air over said fins, mixing therewith in said exhaust throat and passing to the environment.

3. The thermoelectric generator of claim 2 wherein said fuel boiler comprises
(a) an outer housing,
(b) a plurality of spaced burner rings defining a tortuous path for passage of fuel thereover,
(c) a chamber of relatively larger volume for receiving vaporized fuel from the exit of said tortuous path and containing means for removing contaminants from said vapor,
(d) a fuel inlet line to said tortuous path,
(e) a discharge line from said chamber, and
(f) a fuel nozzle connected to said discharge line for injecting fuel vapor into said combustion air aspirator at high velocity.

4. The thermoelectric generator of claim 2 wherein said fuel boiler comprises
(a) an outer housing,
(b) an inlet line to said boiler,
(c) a plurality of stacked, annular rings communicating with said inlet line, each of said rings having a narrow slot therein and communicating with succeeding slots of adjacent rings arranged to define a tortuous flow path for fuel of relatively low volume,
(d) a relatively larger volume chamber communicating with the discharge end of said tortuous path, said chamber containing means for removal of contaminants from the resulting vaporized fuel,
(e) an outlet line extending from the other end of said chamber, and
(f) a fuel nozzle connected to said outlet line, said nozzle being adapted to inject the vaporized fuel at a high velocity into said combustion air aspirator.

5. A thermoelectric generator comprising
(a) a hermetically sealed thermoelectric module containing a plurality of thermoelectric elements,
(b) a centrally disposed sleeve in thermal contact with the hot junctions of said thermoelectric elements,
(c) heat rejection surfaces connected to the outer cold junctions of said thermoelectric elements,
(d) means for electrically insulating said thermoelectric elements from said sleeve and from said heat rejection surfaces,
(e) means for electrically interconnecting said thermoelectric elements within said module,
(f) fuel combustion means positioned within said sleeve, said combustion means having means for uniformly distributing the combustion flame over the surface of said sleeve, said fuel combustion means comprising
(i) a plurality of spaced burner tubes extending axially along and spaced from said sleeve, each of said burner tubes having a plurality of flame ports facing said sleeve,
(g) means for furnishing a fuel vapor-air combustion mixture to said combustion means including
(i) a burner manifold connecting with said burner tubes for uniformly distributing a fuel vapor-air combustion mixture thereto,
(ii) a combustion air aspirator, said aspirator connecting with said manifold at one of its ends and at its other end being adapated to receive a mixture of air and of heated fuel vapor, and
(iii) fuel boiler means for furnishing said fuel vapor at a high velocity to said aspirator, and
(h) means for exhausting combustion products from said generator.

6. A thermoelectric generator comprising
(a) a hermetically sealed thermoelectric module containing a plurality of thermoelectric elements,
(b) a centrally disposed sleeve in thermal contact with the hot junctions of said thermoelectric elements,
(c) heat rejection surfaces connected to the outer cold junctions of said thermoelectric elements, (d) means for electrically insulating said thermoelectric elements from said sleeve and from said rejection surfaces, (e) means for electrically interconnecting said thermoelectric elements within said module, (f) fuel combustion means positioned within said sleeve, said combustion means having means for uniformly distributing the combustion flame over the surface of said sleeve, (g) means for furnishing a fuel vapor-air combustion mixture to said combustion means including a fuel boiler which comprises (i) an outer housing, (ii) a plurality of spaced burner rings defining a tortuous path for passage of fuel thereover, (iii) a chamber of relatively larger volume for receiving vaporized fuel from the outlet of said tortuous path and containing means for removing contaminants from said vapor, (iv) a fuel inlet line to said rings, (v) a fuel vapor discharge line from said chamber, and (vi) a fuel nozzle connected to said discharge line for injecting fuel vapor into said combustion air aspirator at high velocity, and (h) means for exhausting combustion products from said generator.

7. A thermoelectric generator comprising (a) an outer shell, (b) a thermoelectric module comprising a plurality of thermoelectric elements disposed in a plurality of spaced, axially extending tiers, the thermoelectric elements in each tier and the respective tiers being connected in electrical series, (c) a central, axially extending metal sleeve defining a combustion zone thermally connected to and electrically insulated from the hot junctions of said thermoelectric elements, (d) heat rejection surfaces thermally connected to and electrically insulated from the cold junctions of said thermoelectric elements, (e) a plurality of spaced burner tubes extending axially along and spaced from the inner surface of said sleeve, each burner having a plurality of flame ports for uniformly directing combustion flames against said sleeve opposite each couple of thermoelectric elements, (f) a burner manifold connected to said burner tubes for uniformly distributing a combustion mixture of fuel vapor and air to said tubes, said manifold being connected with (g) aspirator means for furnishing said combustion mixture to said manifold from a fuel supply, and (h) means for exhausting combustion gases from said thermoelectric generator, said means adapted to receive combustion product gases passed across said burner tubes after contact with said hot sleeve to draw cooling air across said heat rejection surfaces and to discharge same together with said combustion product gases wherein said exhaust means includes (i) a plurality of ports adapated to pass combustion product gases from the combustion zone at high velocity, (ii) an exhaust throat in communication with said ports and with said cooling fins, and (iii) a plurality of slots on said outer shell for admitting air to said cooling fins, the high velocity passage of combustion gases through said exhaust ports drawing cooling air across said cooling fins by aspiration and mixing therewith in said exhaust throat in discharge from said thermoelectric generator.

References Cited

UNITED STATES PATENTS

| | | | |
|---|---|---|---|
| 151,568 | 6/1874 | Clamond | 136—208 |
| 903,116 | 11/1908 | Vokel | 136—210 |
| 995,017 | 6/1911 | Keevil | 158—104 X |
| 1,950,470 | 3/1934 | Bellamy | 158—104 |
| 2,567,013 | 9/1951 | Feinberg | 158—104 X |
| 3,056,848 | 10/1962 | Meyers | 136—210 |

ALLEN B. CURTIS, *Primary Examiner.*

U.S. Cl. X.R.

158—104